ALL-PASS TRANSFORMER COUPLING NETWORK UTILIZING HIGH FREQUENCY AND LOW FREQUENCY TRANSFORMERS IN PARALLEL CONNECTION
Filed June 20, 1961 3 Sheets-Sheet 1

INVENTOR.
THOMAS R. O'MEARA,
BY
Walter J. Adam
ATTORNEY

INVENTOR
THOMAS R. O'MEARA,
BY
Walter J. Adam
ATTORNEY.

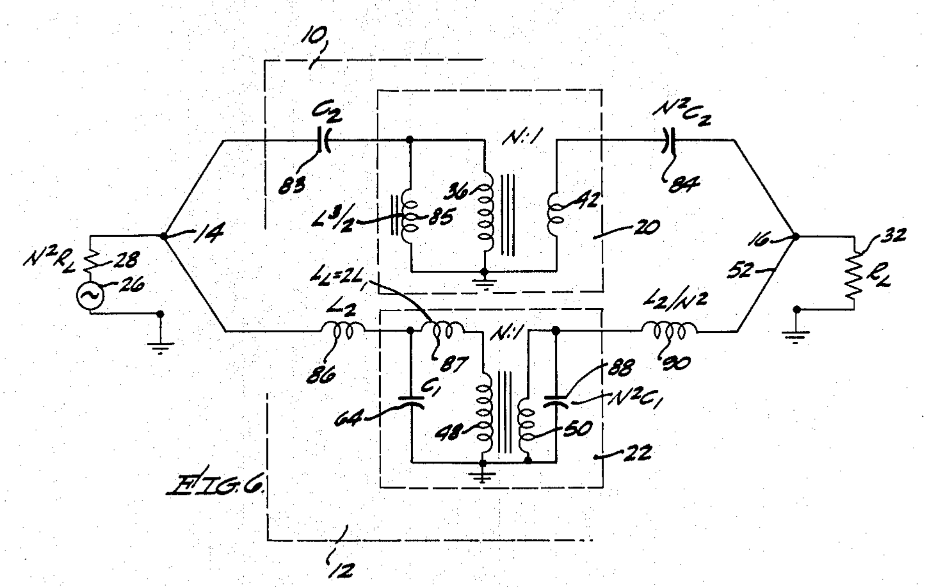
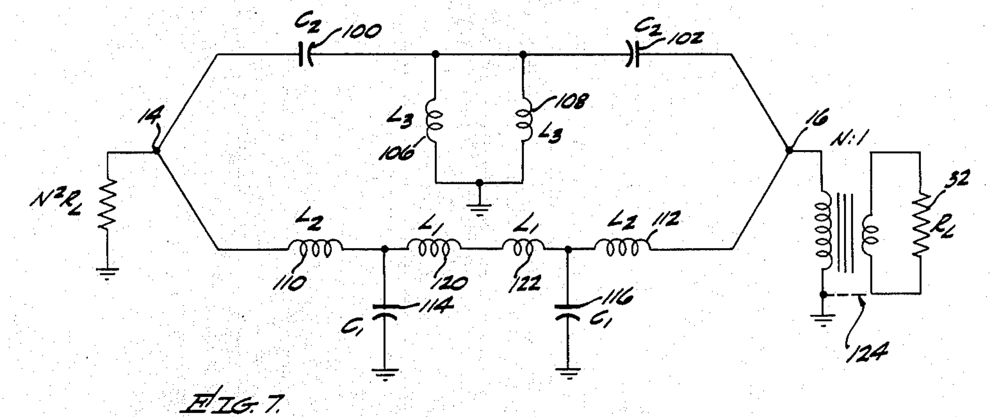
FIG. 7
INVENTOR.
THOMAS R. O'MEARA,
BY
Walter J. Adam
ATTORNEY.

United States Patent Office 3,231,837
Patented Jan. 25, 1966

3,231,837
ALL-PASS TRANSFORMER COUPLING NETWORK UTILIZING HIGH FREQUENCY AND LOW FREQUENCY TRANSFORMERS IN PARALLEL CONNECTION

Thomas R. O'Meara, Los Angeles, Calif., assignor to Hughes Aircraft Company, Culver City, Calif., a corporation of Delaware Filed June 20, 1961, Ser. No. 118,321
7 Claims. (Cl. 333—32)

This invention relates to impedance matching networks and particularly to improved transformer coupling networks having all-pass characteristics over a very large frequency range.

For impedance matching, a useful device when the relative bandwidths required exceed one or two octaves in frequency range is the wide-band, magnetic-core transformer. However, the maximum bandwidth of conventional transformer devices is limited to approximately 1 mc. (megacycle) if the low cut-off frequency is at a few kc. (kilocycles). Although it is feasible to obtain some extensions in bandwidth by arranging the various transformer windings to function as terminated helical transmission lines, limitations are present. One limitation of this arrangement is that the dispersive effects and conductor losses associated with helical delay lines determine an upper cut-off frequency lower than may be required.

The fundamental bandwidth limitations of conventional transformers may be separated into two categories. The first limitation is that any appreciable distributed capacitance developed across the source or the load provides a maximum obtainable bandwidth for a given impedance level. The second fundamental limitation is that independently of the distributed capacitances, most winding configurations are inherently low-pass filters. Thus, realization of a very wide bandwidth with conventional transformer coupling arrangements is restricted.

It is therefore an object of this invention to provide a simplified impedance transforming network, incorporating two or more transformers or transformer-like devices, that has a flat amplitude response over a wider frequency range than obtainable with a single transformation device.

It is a further object of this invention to provide a network incorporating two or more transformers or transformer-like devices and having a substantially all-pass character over a very large frequency range.

It is another object of this invention to provide a network that includes parallel coupled low-pass and high-pass devices having transformer characteristics and that isolates the low-pass device at high frequencies and isolates the high-pass device as low frequencies.

It is still another object of this invention to provide a network that has properties of transformation over a wide frequency range and properties of an all-pass network over the same frequency range.

It is still another object of this invention to provide a plurality of impedance matching networks having element values determined in such a manner that a flat amplitude response is assured.

It is another object of this invention to provide improved transformer networks which are required to be terminated only on one side in their characteristic impedance, the other being terminated in any desired resistive value.

Briefly, in accordance with this invention, suitable coupling networks provide voltage and current transformation over a wide frequency range with all-pass characteristics over the same frequency range. A low-pass device and a high-pass device are coupled in parallel between input and output terminals to respectively respond to low and high frequency components of the combined passband. Capacitive elements are provided to isolate the high frequency device at low frequencies. Depending upon the class of network desired, one or more inductive elements may be provided to isolate the low frequency device at high frequencies. The capacitive and inductive elements and distributed elements of the transformers are selected relative to the terminating resistors to provide a network that is superimposed on the transformer action so that a flat amplitude response is developed in a middle frequency range of the passband. Thus, the network may provide a flat composite amplitude response over the entire frequency range of operation.

The novel features of this invention, as well as the invention itself, both as to its organization and method of operation, will best be understood from the accompanying description taken in connection with the accompanying drawings, in which like characters refer to like parts, and in which:

FIG. 6 is a schematic circuit diagram of another arrangement of the all-pass coupling network in accordance with the invention that further includes both primary and secondary distributed capacitance of a low-frequency transformer device as a design parameter; and FIG. 7 is a schematic circuit diagram equivalent to the network of FIG. 6 in the middle frequency range.

Figure 1:
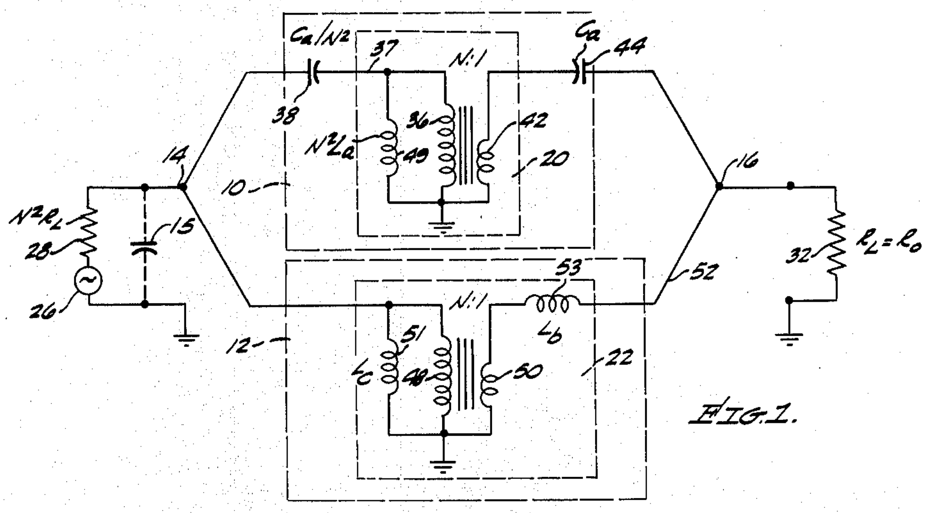
FIG. 1 is a schematic circuit diagram of a first arrangement of the all-pass coupling network in accordance with the invention.

Referring to the network of FIG. 1 which for convenience will be called a class A network, a high-pass filter 10 and a low-pass filter 12 are coupled in parallel between terminals or junction points 14 and 16. The high-pass filter 10 includes an impedance matching device such as a high frequency transformer device 20, that is, a transformer having characteristics for passing signals over a band at relatively high frequencies. The low-pass filter 12 includes a low frequency transformer device 22, that is, a transformer having characteristics for passing signals over a band at relatively low frequencies. The transformer 22 has a passband extending from a relatively low frequency to a crossover frequency which approximates the low frequency cut-off of the transformer 20, and the transformer 20 has a passband extending from this crossover frequency to a relatively high frequency. A generator 26 is coupled between ground and a generator or terminating resistance 28 which may have a value $N^2R_L$ where N is the turns ratio of the transformers 20 and 22 and $R_L$ is a load or terminating resistor 32. The load resistor 32 having the value $R_L$ is coupled between the junction point 16 and ground. The impedance matching between the generator resistor 28 and the load resistor 32 is determined by the transformer action of the transformer devices 20 and 22.

The transformer 20 includes a first winding 36 having a first end coupled through a lead 37 and a coupling capacitor 38 to the junction point 14 and a second end coupled to ground and includes a second winding 42 having a first end coupled through a coupling capacitor 44 to the junction point 16 and a second end coupled to ground. The coupling capacitors 38 and 44 which provide isolation from low frequency components have respective values $$\frac{C_a}{N^2}$$

and $C_a$ where $C_a$ is a selected value and N is the turns ratio of the transformers 20 and 22 such as between the windings 36 and 42. The value of the capacitor 38 is divided by $N^2$ so that the equivalent all-pass network is symmetrical. It is to be noted that N is equal to the square root of the ratio of the value of the generator resistor 28 over the value of the load resistor 32.

The low frequency transformer 22 includes a first winding 48 having one end coupled to the junction point 14 and a second end coupled to ground and includes a second winding 50 having one end coupled through a lead 52 to the junction point 16 and a second end coupled to ground. Similar to the transformer 20 the transformer 22 has the turns ratio N:1 between the windings 48 and 50.

The equivalent networks elements of the devices 10 and 12 include an inductor 49 having a value $N^2L_a$ representing the core inductance of the transformer 20 which is coupled between the lead 37 and ground. In the transformer 22 an inductor 51 representing the core inductance $L_c$ is coupled between the junction point 14 and ground and an inductor 53 representing the combined leakage inductance $L_b$ is coupled between the winding 50 and the lead 52. A capacitor 15 represents the combined distributed capacitance of the network at the junction point 14, which is presumed to be small for proper operation.

The low-end cut-off frequency of a transformer such as 22 is determined by the core inductance $L_c$ while the high-end cut-off frequency is determined by the leakage inductance $L_b$, sometimes in association with a distributed capacitance $C_D$. Because the leakage inductance $L_b$ and the distributed capacitance $C_D$ are intrinsically related to $L_c$ by the number of winding turns and other transformer geometry factors, the upper cut-off frequency is fixed by the lower cut-off frequency. This upper cut-off frequency is in the vicinity of the frequency at which the reactance of $L_b$ is equal to twice the load resistance in magnitude. By supplementing the low frequency transformer 22 with the high frequency transformer 20 and providing isolation in accordance with the invention, the high-end cut-off of the composite network may be extended by an amount approaching one or two orders of magnitude. Further, to provide a substantially flat amplitude response over a wide passband, the middle frequency range centered at crossover frequency of the two transformers and the network elements must be chosen in a prescribed manner.

In a middle frequency range in the region between the passbands of the transformers 22 and 20, the network of FIG. 1 is designed as an all-pass network. The middle frequency range is usually sufficiently high so that the core impedance of the low frequency transformer 22 is negligibly large; the middle frequency range is also sufficiently low so that the leakage reactance of the high frequency transformer 20 is negligibly small.

Figure 2:
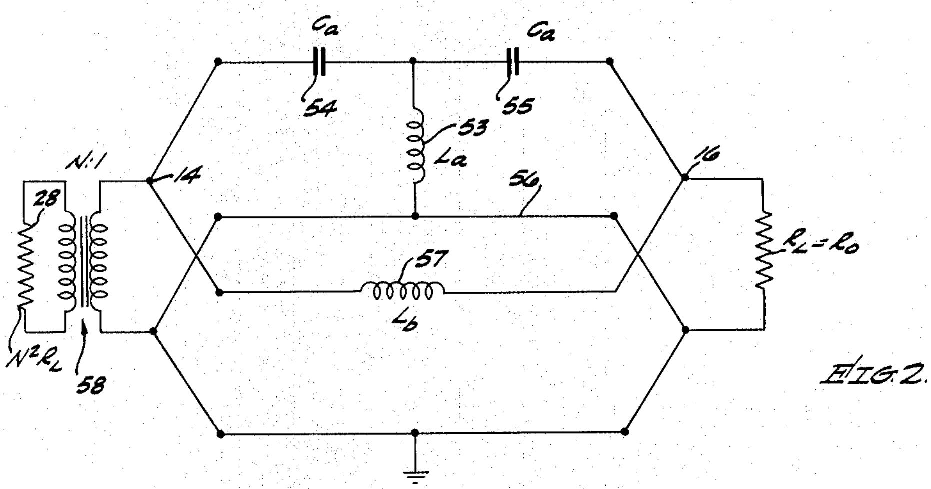
FIG. 2 is a schematic equivalent circuit diagram of the network of FIG. 1 for selecting the elements at the middle frequency range.

Referring to the equivalent network of FIG. 2 the dominant elements in the middle frequency range are selected from the high-pass filter 10 and low-pass filter 12 of FIG. 1. An inductor 53 having a value $L_a$ equivalent to the core inductance of coils 36 and 42 of the high-pass transformer 20 is coupled from between capacitors 54 and 55 to a lead 56 and to ground. The capacitors 54 and 55 are equivalent to the capacitors 38 and 44 of FIG. 1.

A leakage inductor 57 having the value $L_b$ is coupled between the terminals 14 and 16. A transformer 58 coupled to the junction point 14 of the equivalent circuit represents the combined ideal transformers of the network of FIG. 1.

The required design equations for the elements of FIG. 2 to provide an all-pass characteristic at the mid-frequency range are:

$$L_b=\frac{2R_0}{\omega_0} \quad (1)$$

$$L_a=\frac{L_b}{4}=\frac{R_0}{2\omega_0} \quad (2)$$

$$C_a=\frac{1}{R_0\omega_0}=\frac{L_b}{2R_0^2} \quad (3)$$

where $R_0$ is equal to the load resistance $R_L$ and $\omega_0$ is an arbitrary radian frequency parameter which corresponds to the angular transition frequency between the low-pass transformer 22 and the high-pass transformer 20. Thus, the middle frequency range elements, the crossover frequency and the coupling capacitors 38 and 44 are selected to satisfy the conditions of Equations 1, 2 and 3 to provide a constant amplitude response at the middle frequency range. At the low-end of the overall frequency range, the frequency response is determined by the core inductance of the low frequency transformer and at the high frequency end of the frequency range, the frequency response is determined by the distributed parameters of the high frequency transformer. It is to be noted that inductor 49 representing core inductance is selected with a value $N^2L_a$ and the capacitor 38 is selected with a value $C_a/N^2$.

Figure 3:
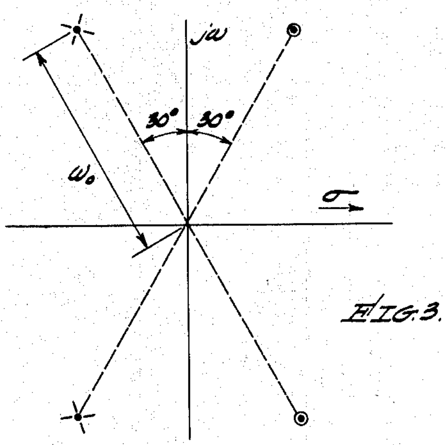
FIG. 3 is a diagram of the real versus imaginary axis for explaining the critical frequency distribution of the all-pass network of FIG. 2.

The all-pass characteristics derived from the equivalent network of FIG. 2 is further illustrated in the complex frequency plane of FIG. 3 which illustrates a function $S=\sigma+j\omega$. The transition frequency $\omega_0$ is the displacement of the critical frequencies from the origin. The poles are located in the left half plane and the zeros are located in the right half plane which are the required properties of an all-pass network. The critical frequencies are separated from the $\omega$ axis by 30 degrees as shown in FIG. 3.

The network of FIG. 1 thus has a constant resistance property so that a constant resistance $N^2R_0$ is presented to the generator 26 over the very wide range of frequencies. Because of this property, the effect of any capacitance loading at either end of the network when the other end is matched may be predicted. The distributed capacitance of the low frequency transformer 22 degrades the frequency response. However, the distributed capacitance of the low frequency transformer 22 may be minimized at the expense of increased leakage inductance by utilizing large interwinding spaces.

The network of FIG. 1 has a cut-off frequency determined by the high frequency parameters which are principally leakage inductance and combined distributed capacitance including that of the high frequency transformer 20. The composite network of FIG. 1 provides an ideally flat gain or magnitude characteristic similar to an ideal transformer. The elements of the network are selected to provide impedance matching to the terminating impedances of both the resistors 28 and 32. However, as will be discussed subsequently, the phase or group time delay characteristics are substantially nonlinear above a peak at the angular transition frequency $\omega_0$.

The network of FIG. 1 as well as other networks in accordance with the invention has the characteristic that for any network, the terminating resistive impedance at either end may be replaced by another purely resistive impedance of a different value without changing the frequency or bandwidth properties of the network. This characteristic results from the constant resistance property of the network which follows from the all-pass characteristics thereof.

Figure 4:
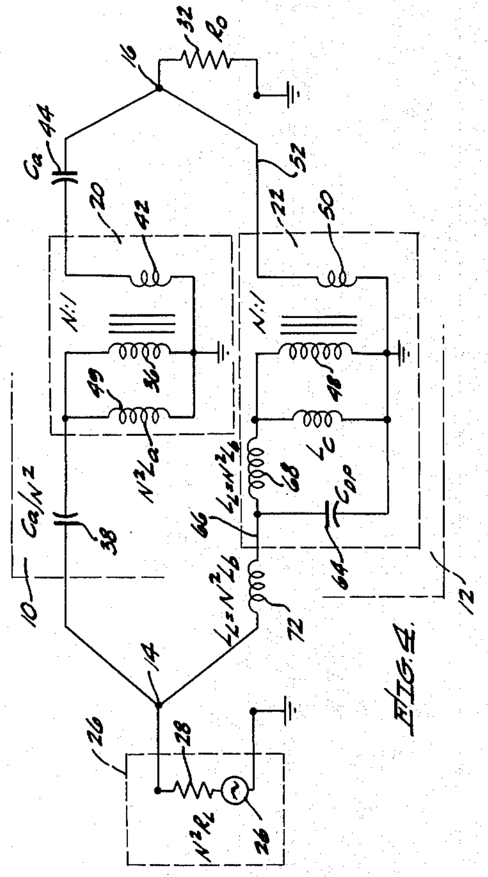
FIG. 4 is a schematic circuit diagram of a second arrangement of the all-pass network in accordance with the invention that includes the most troublesome component of a low-frequency transformer which is distributed capacitance as a design parameter.

When the dominant shunt capacitance of the coupling network is contributed by the low frequency transformer, the network of FIG. 4 offers substantial advantages in accordance with this invention. With transformers which have large turn ratios and conventional winding configurations, distirbuted capacitance of the winding on the high impedance side dominates the distributed capacitance on the low impedance side by more than an order of magnitude. Thus, compensation may be provided for the distributed capacitance on the high impedance side of the low frequency transformer with the improved network of FIG. 4. A capacitor 64 representing the distributed capacitance $C_{DP}$ on the high impedance side of the transformer 22 is shown coupled between a lead 66 and ground. An inductor 68 representing the leakage inductance $L_L$ of the transformer 22 is coupled between the lead 66 and the primary winding 48. The leakage inductance $L_L$ which for convenience is referenced to the high impedance side of the transformer 22 is equal to $N^2L_b$ where $L_b$ is the leakage inductance referenced to the low impedance side of the tranformer as shown in FIG. 1. To prevent the distributed capacitance $C_{DP}$ from short circuiting the input signals to the network at high frequencies, an inductor 72 having value $L_L$ is coupled between the junction point 14 and the lead 66. The distributed capacitance $C_{DP}$ is equal to $C_b/N^2$ where $C_b$ (not shown) is the equivalent distributed capacitance when referenced to the low impedance side of the transformer 22.

A middle frequency range equivalent twin T network (not shown) neglecting the high frequency parameters of the high frequency transformer 20 and the distributed capacitance on the low impedance side of the transformer 22 may be formed according to the principles of FIG. 2. The design equations which may be derived from this twin T for the elements of FIG. 4 are:

$$\frac{L_a}{C_a}=\frac{L_b}{C_b}=R_o^2 \qquad (4)$$

$$L_a=\frac{L_b}{2} \qquad (5)$$

$$C_a=\frac{C_b}{2} \qquad (6)$$

and $$\frac{1}{L_bC_a}=\frac{1}{L_aC_b}=\frac{1}{\omega_0^2} \qquad (7)$$

where $L_b$ and $C_b$ are respectively the leakage inductance and the distributed capacitance of the transformer 22 when referenced to the low impedance (winding 50) side of the transformer 22 and $\omega_0$ is the crossover frequency. Thus, the values of the elements of the network of FIG. 4 may be determined.

In the all-pass network having element values determined by Equations 4 through 7, the critical frequencies are separated from the real frequency $\omega$ axis similar to the manner shown in FIG. 3 except with 45 degrees separation.

It is to be noted that the distributed capacitance $C_{DP}$ becomes a design element in FIG. 4 so as to not degrade the all-pass performance of the network. Thus, the class B configuration of FIG. 4 isolates the major portion of the distributed capacitance from the source and provides a relatively wide frequency band having all-pass characteristics.

Figure 5:
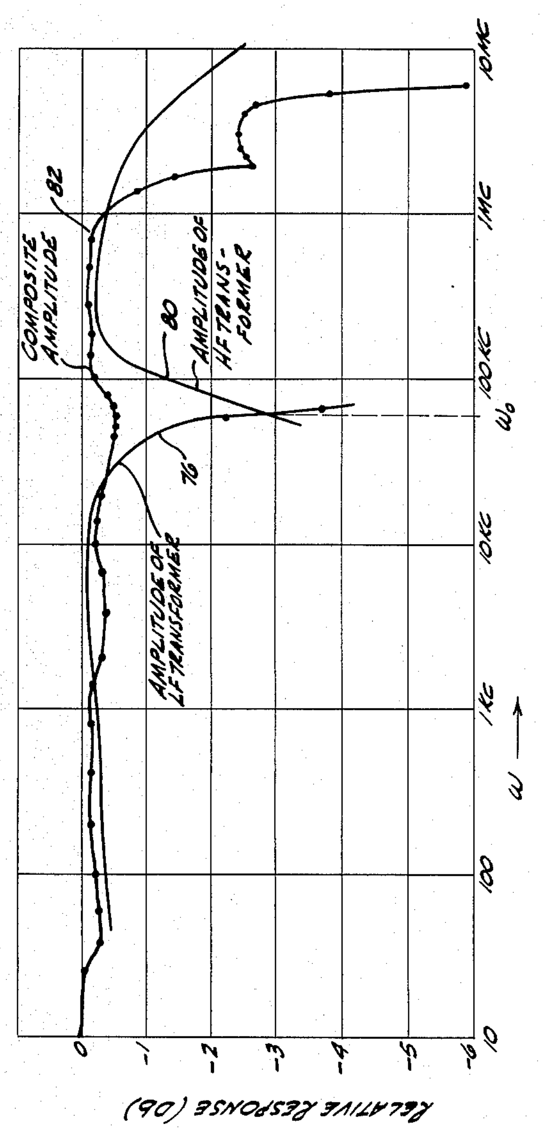
FIG. 5 is a graph of amplitude in decibels as a function of radian frequency for explaining the characteristics of the high-pass and low-pass transformers of FIG. 4 and the combined characteristics thereof.

For further explaining the characteristics of the network of FIG. 4, the low frequency transformer 22 has amplitude characteristics in decibels of a curve 76 as a function of radian frequency in FIG. 5. A curve 80 shows the amplitude characteristics for the high frequency transformer 20 crossing the curve 76 at the crossover frequency $\omega_0$. The composite of the curves 76 and 80 is shown by a curve 82 having a substantially flat amplitude response over the entire passband which for example may be between 10 cycles and 8 mc. (megacycles).

The group time-delay in milliseconds for the low frequency transformer 22 is relatively flat in the low frequency range but becoming substantially non-constant at higher frequencies to approximately the crossover frequency. The composite time-delay characteristics of the high-pass transformer 20 varies with frequency similar to that of the low-pass transformer so that the composite network does not function as an ideal transformer, that is, does not have linear phase characteristics. The group delay falls to relatively low values at frequencies slightly higher that the crossover frequency $\omega_0$. However, conventional all-pass network sections may be coupled to the output junction point 16 of the networks in accordance with the invention to provide a more desired phase or group delay characteristics. It has been found that the group delay time characteristics of the network of FIG. 4 are appreciably flatter than for the network of FIG. 1.

An example of parameters of a class B network of FIG. 4 that provides substantially the passband of FIG. 5 is the following:

$N$:1=7.9:1
$C_a/N^2$=623 micro-microfarads
$C_{DP}$=575 micro-microfarads
$C_a$=0.039 microfarad
$L_L$=12.2 milli-henries
Core inductance of transformer 20=6.1 milli-henries
$C_{DP}$=670 micro-microfarads
$C_{DS}$=600 micro-microfarads=distributed capacitance on low impedance side of transformer 22
$R_g$=3 kilo-ohms
$R_0$=50 ohms If the turns ratio of the low frequency transformer is moderate or if extremely large extensions in bandwidth are required, the distributed capacitance or winding resonances on the low impedance side of the low frequency transformer 22 will prove limiting. The impedance matching network of FIG. 6 which will be referred to as a class C network has the common transformer and load elements of FIGS. 1 and 4 designated with similar reference characters. Coupling capacitors 83 and 84, coupled respectively between the junction point 14 and the winding 36 and between the junction point 16 and the winding 42, have designated values $C_2$ and $N^2C_2$. The core inductance of the high frequency transformer 20 is shown as an inductor 85 having a value $$\frac{L_3}{2}$$

where $L_3$ will be explained subsequently. The leakage inductance of the low frequency transformer 22 referenced to the high impedance side is shown by an inductor 87 having a value $L_L$ equal to 2 $L_1$ where $L_1$ will be explained subsequently. An isolating inductor 86 having a value $L_2$ is coupled between the junction point 14 and the winding 48. The distributed capacitance $N^2C_1$ developed across the low impedance winding 42, 50 of the low frequency transformer 22 is represented by a capacitor 88. For preventing high frequency components from being short circuited from the junction point 16, an inductor 90 is coupled between the junction point 16 and the winding 50.

A parallel ladder network equivalent to the network of FIG. 6 in the middle frequency range is shown in FIG. 7 with the coupling capacitors 83 and 84 represented by capacitors 100 and 102 having values of $C_2$ and the core inductance of the high frequency transformer 20 represented by inductors 106 and 108 having values of $L_3$. The isolating inductors 86 and 90 are represented by inductors 110 and 112 having values $L_2$, and the capacitors 64 and 88 are represented by capacitors 114 and 116 having values of distributed capacitance of $C_1$. The leakage inductance of the windings 48 and 50 of the low frequency transformer 22 is represented by inductors 120 and 122 having values of $L_1$ and coupled in series between the inductor 110 and 112. The equivalent network of FIG. 7 makes evident the symmetrical parallel ladder structure for which the element values may be selected to provide an all-pass characteristic at the middle frequency range. The reactance arms of equivalent lattice of FIG. 7 are chosen to be duals at the operating frequency. Utilizing conventional techniques, the transformer elements are combined as a transformer 124 coupled between the junction point 16 and the load resistor 32.

For an impedance level of one ohm and a frequency $\omega_1=(L_1C_1)^{-1/2}$ normalized to one radian, the required element values may be expressed as:

$$L_1=L_3=(1-X_0^2)^{1/2}\doteq 0.731 \text{ henries}$$

$$L_2=\frac{(1-X_0^2)^{1/2}}{X_0}\doteq 1.071 \text{ henries}$$

$$C_1=(1-X_0^2)^{1/2}\doteq 1.368 \text{ farads}$$

$$C_2=\left(\frac{1-X_0}{1+X_0}\right)^{1/2}\doteq 0.434 \text{ farads}$$

where $X_0$ is the real root of the equation of a variable X:

$$X^3+X-1=0$$

and is approximately given by:

$$X_0\doteq 0.68233$$

These element values may be obtained by first deriving an expression for the impedance of a first and a second dual arm utilizing Barlet's bisection theorem to derive an equivalent lattice at the middle frequency range and setting the product of these two impedances equal to the value one as is required for all pass characteristics. This latter equation of the product of the impedances requires that the critical frequencies of the two arms must coincide and the constant multipliers of the two impedance equations have a predetermined relationship. In order to obtain sufficient simultaneous equations the critical frequencies of the dual arms are equated for the equivalent lattice which are then reduced to equations of the element values by simple inspection of the lattice arms. Each of the poles and zeros of the first arm are then equated to corresponding zeros and poles respectively of the second arm to provide two expressions relating the frequencies and the element values. Equations involving the capacitance ratio and one expression involving the inductance ratio, all as a function of a variable X are then derived. Eliminating the capacitance ratio between two of these expressions gives the above cubic equation in X. This cubic equation is then solved to obtain the above root of $X_0$ which is then inserted into the equations involving the ratios of the element values. The choice of a normalization or crossover frequency $\omega_1$ then provides the final equations for $L_1$, $L_2$, $C_1$ and $C_2$ as a function of the root $X_0$.

Thus, the transformers and elements of the network of FIG. 6 are selected in accordance with the above equations to provide an impedance matching network having all-pass characteristics over a very wide bandwidth. The general operating characteristics are similar to those shown in the graph of FIG. 5. It is to be noted that the group delay characteristics of the network of FIG. 6 are substantially nonconstant at higher frequencies as discussed relative to the types A and B networks. It has been found that the group delay characteristics of the Type C network of FIG. 6 is less flat than for the Type B network. It is also to be noted that the core inductance of the low frequency transformer 22 is not utilized as a design parameter in the networks of the invention because the impedances thereof is substantially larger than for the other elements of the network.

Although the frequency span ratio of the networks of the invention may be 8 decades or more, the lumped parameter approach to the element values is substantially reliable as a middle range design criteria. Frequently, to satisfy the required ratio of leakage inductance to distributed capacitance, additional shunt capacitance may be added across the transformer windings. This capacitance improves the validity of the assumed lumped parameter model.

Magnetic cores may advantageously be used in the series inductors such as 72, 86 or 90. Because of the rapid deterioration of loss factor with increasing frequency of ferromagnetic materials, the additional damping introduced may eliminate undesirable resonances in accordance with the invention. Further, the magnetic cores for the isolating inductors such as 72 and 90 may be chosen to provide a small size winding and a small distributed capacitance.

In practice, the power level or commercial availability may determine the core size of the transformers. Then selecting a given core with a given permeability, the low frequency cut-off of the low frequency transformer 22 determines the required number of turns. This number of turns together with the spacing between windings determines both the leakage inductance and (with other features) the distributed capacitance. Leakage inductance increases with interwinding spacings while distributed capacitance decreases according to well known design equations characteristic of each winding type. The interwinding spacing may be such that the leakage inductance to distributed capacitance ratio exceeds the design values of the desired network class. Additional fixed capacitance may be then added to yield the required effective ratio. The product of the total effective distributed capacitance and the leakage inductance of a selected low frequency transformer determine the transition frequency $\omega_0$ as well as the required core inductance of the high frequency transformer. Principles similar to those discussed above are applicable to the determination of the required number of turns of the high frequency transformer.

It is to be noted that the high frequency transformer 20 is typically small and light in weight. In most networks a closed magnetic core is not required for the high frequency transformer. For example, the high frequency transformer 20 may be any type of impedance matching device having a defined core inductance such as a transmission line transformer. Also, it is to be noted that the low frequency transformer 22 may be replaced by any equivalent device within the principles of the invention. In accordance with the invention, the teachings can be extended to include more complex networks which include additional elements in the low and high pass filter devices. For example, one purpose may be to provide improved group delay or phase characteristics.

Thus, in accordance with the invention, three Classes A, B and C of impedance matching networks have been described of increasing orders of complexity. All of the networks provide all-pass characteristics over a wide band of frequencies and with the bandwidth generally increasing with higher orders of complexity. The element values of the networks are simply and reliably selected to have the desired all-pass characteristics. All of the networks of the invention have a constant resistance over the majority of the frequency range. Although the networks do not have the group delay characteristics of an ideal transformer, they are highly useful in audio amplifiers, for example. Also, suitably designed all-pass networks may be provided at the outputs of the networks of the invention to develop a desired phase response.

What is claimed is:

1. A network for matching impedances between first and second terminals comprising a first transformer coupled between said first and second terminals and having a passband starting at a relatively low frequency and extending to a transition frequency, a second transformer coupled between said first and second terminals in parallel with said first transformer and having a passband starting at said transition frequency and extending to a relatively high frequency, first and second isolating means coupled respectively between the first and second terminals and said first transformer for substantially isolating said first transformer at high frequencies, and third and fourth isolating means coupled respectively between said first and second terminals and said second transformer for substantially isolating said second transformer at low frequencies.

2. A network for providing an all-pass characteristic over a passband between a first and a second terminal comprising a first transformer coupled between said first and second terminals and having a passband starting at a relatively low frequency and extending to a transition frequency, a second transformer coupled between said first and second terminals in parallel with said first transformer and having a passband starting substantially at said transition frequency and extending to a relatively high frequency, and first and second capacitors coupled respectively between the first and second terminals and said second transformer for isloating said second transformer at low frequencies, said first transformer including distributed elements, said distributed elements and first and second capacitors having values selected to provide the all-pass characteristic in a frequency region centered on said transition frequency, said first and second transformers providing an all-pass characteristic over a respective low frequency and high frequency region, said network thereby providing a continuous all-pass characteristic over the entire passband.

3. An impedance matching network providing a substantially flat amplitude response to signals over a relatively wide passband comprising first and second impedance elements, a high frequency transformer having first and second terminals, a low frequency transformer having first and second terminals, like terminals of both transformers being coupled to selected ends of said first and second impedance elements, each transformer having selected inductance and capacitance characteristics, first and second capacitors coupled respectively between the first and second terminals of said high frequency transformer and the selected ends of said first and second impedance elements, and an inductor coupled between the second terminal of said second transformer and said second impedance element, said low-pass transformer transmitting substantially all signals over a low frequency range of the passband and said high-pass transformer transmitting substantially all signals over a high frequency range of the passband to provide a flat amplitude response over the respective ranges, the values of said selected inductance and capacitance characteristics of both of said transformers together with the values of said first and second capacitors and of said inductor controlling the transmission of signals through said transformers to provide a substantially flat amplitude response over a middle frequency range of the passband.

4. A network having all-pass characteristics over a wide passband of frequencies for coupling between a source of signals and an impedance element comprising first and second junction points coupled respectively to said source of signals and said impedance element, a first transformer having high-pass characteristics and a first and second winding, said first transformer having a core inductance, a first capacitor coupled between said first junction point and said first winding of said first transformer, a second capacitor coupled between said second junction point and said second winding of said first transformer, a second transformer having low-pass characteristics and a first and second winding coupled to said second junction point, said second transformer having a distributed capacitance and having a leakage inductance across said first winding, and an isolating inductor coupled between said first junction point and the first winding of said second transformer, said core inductance of said first transformer, said distributed capacitance and leakage inductance of said second transformer, said first and second capacitors and said isolating inductor having values to provide an all-pass characteristic in a middle frequency range of the passband substantially between the passbands of said first and second transformers so that said network provides a substantially constant all-pass characteristic over said passband.

5. A network having a relatively flat amplitude response over a wide passband for providing impedance matching between a source of signals and an impedance element comprising first and second junction points coupled respectively to the source of signals and the impedance element, a first transformer having high-pass characteristics and having first and second windings, said first transformer having a core inductance, a first capacitor coupled between the first winding of said first transformer and said first junction point, a second capacitor coupled between the second winding of said first transformer and said second junction point, a second transformer having low-pass characteristics and having a first and second winding, said second transformer having distributed capacitance across said first and second windings and a leakage inductance, a first inductor coupled between the first winding of said second transformer and said first junction point, and a second inductor coupled between the second winding of said second transformer and said second junction point, said first and second capacitors, said core inductance of said first transformer, said distributed capacitance and leakage inductance of said second transformer, and said first and second inductors having values for providing a flat amplitude response over a middle frequency region of said passband, said network thereby providing a flat amplitude response over said passband.

6. A network for providing a substantially flat amplitude response to a signal between first and second terminating impedance means over a wide passband having low frequency, middle frequency and high frequency regions comprising a source of reference potential, a first transformer having high-pass characteristics, said first transformer having a first and a second winding each having one end coupled to said source of reference potential, first and second capacitors respectively coupled between the first impedance means and the other end of said first winding and between the second impedance means and the other end of said second winding, said first transformer having a selected core inductance, a second transformer having low-pass characteristics, said second transformer having a low-pass characteristics, said second transformer having a third and fourth winding each having one end coupled to said source of reference potential, and first and second inductors respectively coupled between said first impedance means and the other end of said third winding and between said second impedance means and the other end of said fourth winding, said second transformer having a selected leakage inductance and a selected distributed capacitance, said first and second capacitors, said first and second inductors, the core inductance of said first transformer and said leakage inductance and distributed capacitance of said second transformer having values selected to provide the flat amplitude response in the middle frequency region.

7. An impedance matching network for providing a substantially flat amplitude response over a wide passband comprising a source of reference potential, first and second terminating impedances each having a first and second end with the first ends coupled to said source of reference potential, a first transformer having high-pass characteristics and a first and a second winding each having a first and second end, the first ends of said first and second windings coupled to said source of reference potential, a first capacitor coupled between the second end of said first terminating impedance and the second end of the first winding of said first transformer, a second capacitor coupled between the second end of said second terminating impedance and the second end of said second winding of said first transformer, a second transformer having low-pass characteristics and a first and a second winding each having a first and a second end, the first ends of said first and second windings of said second transformer coupled to said source of reference potential, a first inductor coupled between the second end of said first terminating impedance and the second end of said first winding of said second transformer and a second inductor coupled between the second end of said second terminating impedance and the second end of said second winding of said second transformer, said first transformer including core inductance elements and said second transformer including leakage inductance and distributed capacitance elements, the elements of said transformer and said first and second capacitors and inductors having values to provide the flat amplitude response over a middle frequency range of the wide passband.

References Cited by the Examiner

UNITED STATES PATENTS

| | | | |
|---|---|---|---|
| 1,959,494 | 5/1934 | Nyquist | 333—28 |
| 2,067,443 | 1/1937 | Gewertz | 333—28 |
| 2,301,245 | 11/1942 | Bode | 333—75 |
| 2,932,804 | 4/1960 | Matson | 333—75 |
| 2,963,666 | 12/1960 | Oswald | 333—10 |
| 3,106,688 | 10/1963 | Johnson | 333—32 |

HERMAN KARL SAALBACH, *Primary Examiner.*

BENNETT G. MILLER, *Examiner.*